United States Patent
Xie

(10) Patent No.: US 10,078,532 B2
(45) Date of Patent: Sep. 18, 2018

(54) RESOURCE MANAGEMENT METHOD AND DEVICE FOR TERMINAL SYSTEM AMONG MULTIPLE OPERATING SYSTEMS

(71) Applicant: ZTE CORPORATION, Shenzhen, Guangdong Province (CN)

(72) Inventor: Zhongkun Xie, Shenzhen (CN)

(73) Assignee: ZTE CORPORATION (CN)

( * ) Notice: Subject to any disclaimer, the term of this patent is extended or adjusted under 35 U.S.C. 154(b) by 77 days.

(21) Appl. No.: 15/112,228

(22) PCT Filed: Jun. 6, 2014

(86) PCT No.: PCT/CN2014/079416
§ 371 (c)(1),
(2) Date: Jul. 18, 2016

(87) PCT Pub. No.: WO2015/106529
PCT Pub. Date: Jul. 23, 2015

(65) Prior Publication Data
US 2016/0378553 A1 Dec. 29, 2016

(30) Foreign Application Priority Data
Jan. 20, 2014 (CN) .......................... 2014 1 0026010

(51) Int. Cl.
*G06F 9/50* (2006.01)
*G06F 9/448* (2018.01)
(Continued)

(52) U.S. Cl.
CPC ........ *G06F 9/5011* (2013.01); *G06F 9/44505* (2013.01); *G06F 9/5016* (2013.01);
(Continued)

(58) Field of Classification Search
None
See application file for complete search history.

(56) References Cited

U.S. PATENT DOCUMENTS 5,504,904 A * 4/1996 Dayan .................. G06F 9/4411
713/1
7,577,667 B2 * 8/2009 Hinshaw ........... G06F 17/30477
(Continued)

FOREIGN PATENT DOCUMENTS

CN 1869931 A 11/2006
CN 101371227 A 2/2009
(Continued)

OTHER PUBLICATIONS

International Search Report and Written Opinion dated Oct. 22, 2014 in PCT Patent Application No. PCT/CN2014/079416.

*Primary Examiner* — Abu Ghaffari
(74) *Attorney, Agent, or Firm* — Plumsea Law Group, LLC

(57) ABSTRACT

The present document relates to a system resource management method and device for a terminal. The method includes: partitioning a memory chip of the terminal into a customized data partition and at least one operating system partition, the customized data partition being used for storing system characteristic resource data, and the operating system partition being used for storing system general function resource data; and respectively managing the resource data of the customized data partition and the at least one operating system partition, and sharing the resource data of the customized data partition in the at least one operating system partition. The present document avoids the influence of system operation and update on customized data, reduces the system maintenance complexity and operating cost of the terminal, and at the same time decreases the download traffic of update data.

8 Claims, 8 Drawing Sheets

(51) Int. Cl.
*G06F 9/445* (2018.01)
*G06F 8/60* (2018.01)
*G06F 3/06* (2006.01)

(52) U.S. Cl.
CPC .............. *G06F 3/0644* (2013.01); *G06F 8/60* (2013.01); *G06F 9/5077* (2013.01)

(56) References Cited

U.S. PATENT DOCUMENTS

| | | |
|---|---|---|
| 8,261,231 B1 | 9/2012 | Hirsch et al. |
| 2007/0169084 A1* | 7/2007 | Frank .................. G06F 9/44505 717/168 |
| 2008/0120350 A1* | 5/2008 | Grabowski ....... G06F 17/30067 |
| 2008/0222160 A1* | 9/2008 | MacDonald .............. G06F 8/61 |
| 2009/0013103 A1* | 1/2009 | Chang .................. G06F 13/385 710/36 |
| 2009/0193266 A1* | 7/2009 | Gable .................. G06F 21/805 713/193 |
| 2012/0066333 A1* | 3/2012 | Browning ............... G06F 9/541 709/212 |
| 2012/0278586 A1* | 11/2012 | Caufield ................. G06F 9/505 711/173 |
| 2013/0182002 A1* | 7/2013 | Macciola ............... H04N 1/387 345/589 |
| 2013/0332926 A1* | 12/2013 | Jakoljevic ........... G06F 9/45533 718/1 |
| 2014/0040887 A1* | 2/2014 | Morariu ............. G06F 9/44505 718/1 |
| 2014/0075567 A1* | 3/2014 | Raleigh ................. H04W 12/10 726/26 |
| 2014/0359558 A1* | 12/2014 | Chamberlain ............ G06F 8/34 717/105 |

FOREIGN PATENT DOCUMENTS

| | | |
|---|---|---|
| CN | 101894042 A | 11/2010 |
| CN | 102520983 A | 6/2012 |

* cited by examiner

RESOURCE MANAGEMENT METHOD AND DEVICE FOR TERMINAL SYSTEM AMONG MULTIPLE OPERATING SYSTEMS

CROSS-REFERENCE TO RELATED APPLICATION(S)

This application is the U.S. National Phase application of PCT application number PCT/CN2014/079416 having a PCT filing date of Jun. 6, 2014, which claims priority of Chinese patent application 201410026010.2 filed on Jan. 20, 2014, the disclosures of which are hereby incorporated by reference.

TECHNICAL FIELD

The present document relates to the field of communication technology, in particular to a system resource management method and device for a terminal.

BACKGROUND OF RELATED ART

At present, with the continuous development of mobile communication technologies, types of mobile terminal devices such as smart phones, tablet computers and other wireless data terminals or the like, continuously increase. At the same time, software and hardware technologies of terminal devices are further improved, such that a plurality of operating systems can be installed in one terminal device. For example, Android and Windows Phone systems or other operating systems can be preset in the same mobile phone terminal.

In addition, communication network operators put forward various contract customized terminals at present in order to expand the development of services thereof, i.e., personalized functions and services are customized in an original terminal operating system. Under an operator network, there may be many brands, such as pre-payment and post-payment, etc, resources and applications preset in terminals of each brand may be different and corresponding terminal versions are also different. Due to diversification of terminal device models and operating systems, consequently terminal system version management, maintenance and upgrading become complex problems.

SUMMARY OF THE INVENTION

In order to solve the existing technical problem, the embodiments of the present document mainly provide a system resource management method and device for a terminal, in order to reduce the maintenance complexity and cost of the terminal operating system.

The embodiment of the present document provides a system resource management method for a terminal, including:

partitioning a memory chip of a terminal into a customized data partition and at least one operating system partition, the customized data partition being used for storing system characteristic resource data, and the operating system partition being used for storing system general function resource data; and respectively managing resource data of the customized data partition and the at least one operating system partition, and sharing the resource data of the customized data partition in the at least one operating system partition.

The embodiment of the embodiment of the present document provides a system resource management device for a terminal, including:

a partition module configured to partition a memory chip of a terminal into a customized data partition and at least one operating system partition, the customized data partition being used for storing system characteristic resource data, and the operating system partition being used for storing system general function resource data; and a management operation module configured to respectively manage the resource data of the customized data partition and the at least one operating system partition, and share the resource data of the customized data partition in the at least one operating system partition.

According to the system resource management method and device for the terminal provided by the embodiments of the present document, by partitioning the memory chip of the terminal into an independent customized data partition and operating system partitions, system general functions are distinguished from customized functions, and the resource data of the customized data partition and the operating system partition are respectively managed and the resource data of the customized data partition are shared in one or more operating system partitions, the influence of system operation and update on the customized data is avoided; and since all operating systems in the terminal share and use the resources in the customized data partition and terminal operating system characteristics are customized, the system maintenance complexity and operating cost of the terminal are reduced and at the same time the download traffic of update data is decreased.

In order to make the technical solution of the present document to be clearer, the present document will be further described below in detail in combination with the drawings.

SPECIFIED EMBODIMENTS OF THE INVENTION

It should be understood that the specified embodiments described here are just used for explaining the present document instead of limiting the present document.

The solutions of the embodiments of the present document are mainly as follows: a memory chip of a terminal is partitioned into an independent customized data partition and operating system partitions to distinguish system general functions from customized functions, resource data of the customized data partition and the operating system partition are respectively managed and the resource data of the customized data partition are shared in one or more operating system partitions, in order to avoid the influence of system operation and update on the customized data, reduce the system maintenance complexity and operating cost of the terminal and at the same time decrease the download traffic of update data.

Figure 1:
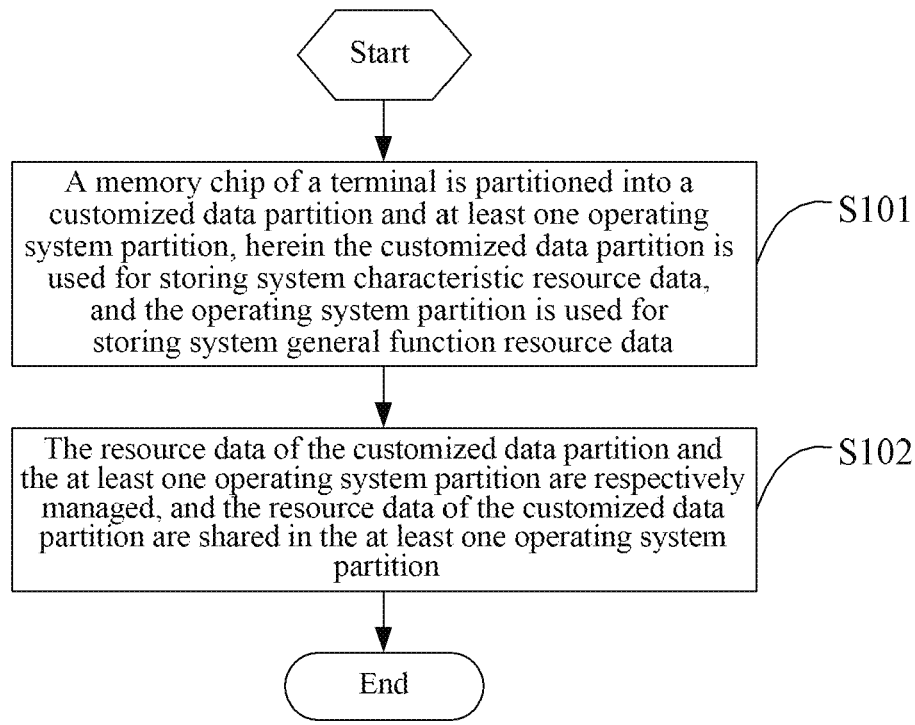
FIG. 1 is a flowchart of an embodiment of a system resource management method for a terminal according to the present document.

As shown in FIG. 1, one embodiment of the present document provides a system resource management method for a terminal, including:

in step S101, a memory chip of a terminal is partitioned into a customized data partition and at least one operating system partition. Herein the customized data partition is used for storing system characteristic resource data, and the operating system partition is used for storing system general function resource data.

The terminal in this embodiment has a communication data service function, which may be specifically a terminal device such as a smart phone or a tablet computer or the like, and the terminal may be provided with one or more operating systems, herein, for example, one operating system is an Android smart operating system.

In this embodiment, functions of terminal operating systems are divided into general functions and customized functions. For a number of the operating systems, the memory chip of the terminal is correspondingly partitioned into a plurality of operating system partitions and an independent customized data partition, one operating system is installed in each operating system partition and all operating system partitions do not influence with one another. When the terminal is started, the operating system to be started may be selected.

Herein, the operating system partitions are used for storing system general function resource data and may specifically include file contents of corresponding drive read-write partitions.

The customized data partition is used for storing system characteristic resource data. The system characteristic resource data include system function customizing files and system interface customized resources, and may specifically include resource data such as function configuration files, pictures, ring tones and network links of the terminal system and the like. Each system characteristic resource has a unique version number, and matches with a terminal system version number.

In this embodiment, the purpose of partitioning the independent customized data partition is that the general functions can be distinguished from the customized functions in the operating systems, such that upgrade of the general function resource data and the system characteristic resource customized data in the terminal operating system are two independent upgrading processes. Respective partition contents only need to be updated when updating data. No mutual influence is caused, thus the influence of terminal system updating update or other operations on data is avoided and at the same time the system version maintenance complexity of the terminal is decreased.

In step S102, the resource data of the customized data partition and the at least one operating system partition are respectively managed, and the resource data of the customized data partition are shared in the at least one operating system partition.

Since the functions of the terminal operating systems are divided into general functions and customized functions and corresponding partitions are respectively arranged, thus the resource data of the customized data partition and the one or more operating system partitions can be respectively managed, and the resource data of the customized data partition can be shared in the one or more operating system partitions.

Herein, respectively managing the resource data of the customized data partition and the one or more operating system partitions includes: respectively performing operations such as configuration and upgrading and the like on the system characteristic resource data of the customized data partition and the system general function resource data of the one or more operating partitions.

When upgrading the system characteristic resource data, the terminal periodically downloads the system characteristic resource data from a version management server and further stores system characteristic resource data in the customized data partition according to a current terminal system version number, current registered network service information and the like.

Herein, the version management server is arranged and maintained by a communication operator or a terminal manufacturer and is used for storing terminal system characteristic customized resources, and each system characteristic customized resource has a unique version number, and matches with a terminal system version number. The system characteristic resources include resources such as system attribute and function configuration files, wallpaper, ring tones, network links and the like.

For a terminal with a plurality of operating systems, when the terminal is started, one operating system may be selected to be started. After the initialization of the terminal operating system is completed, the terminal is periodically connected with the version management server to update the system characteristic customized resources.

In the starting process of the operating system, the customized partition data may be read, by a management module program in the system, and the customized function is applied to the system. Each operating system may read the resource data in the customized data partition, after the customized data resources are upgraded in one operating system, the customized data resources can be shared and used by other operating systems, and thus the download traffic of the update data can be reduced.

In addition, since all operating systems in the terminal can share the resource data in the customized data partition and the operating system characteristics of the terminals are customized, the system maintenance complexity of the terminal can be reduced and the operating cost can be reduced.

Figure 2:
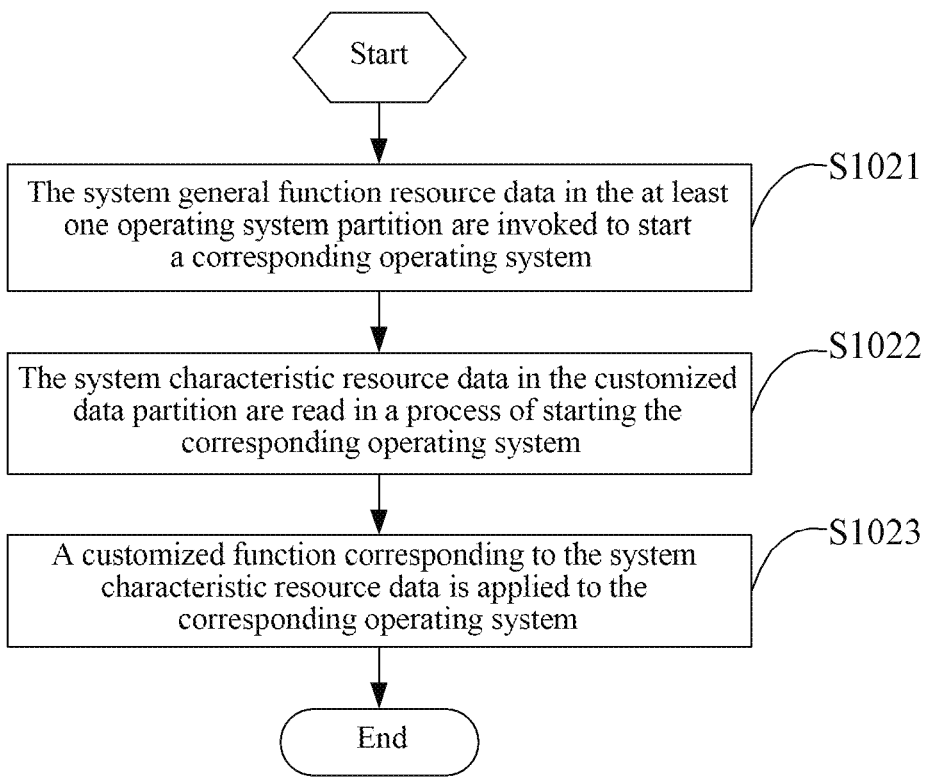
FIG. 2 is a flowchart of sharing resource data of a customized data partition in at least one operating system partition in the embodiment of the present document.

Herein, as an embodiment, as shown in FIG. 2, in the step S102, the step of sharing the resource data of the customized data partition in the at least one operating system partition includes:

in step S1021, the system general function resource data in the at least one operating system partition are invoked to start a corresponding operating system.

In step S1022, the system characteristic resource data in the customized data partition are read in a process of starting the corresponding operating system.

In step S1023, a customized function corresponding to the system characteristic resource data is applied to the corresponding operating system.

Through the above-mentioned solution, after the operating system is started, the system characteristic resource data in the customized data partition are read, and the operating system characteristics of the terminal are customized, thus the system maintenance complexity of the terminal can be reduced and the operating cost can be reduced.

Figure 3:
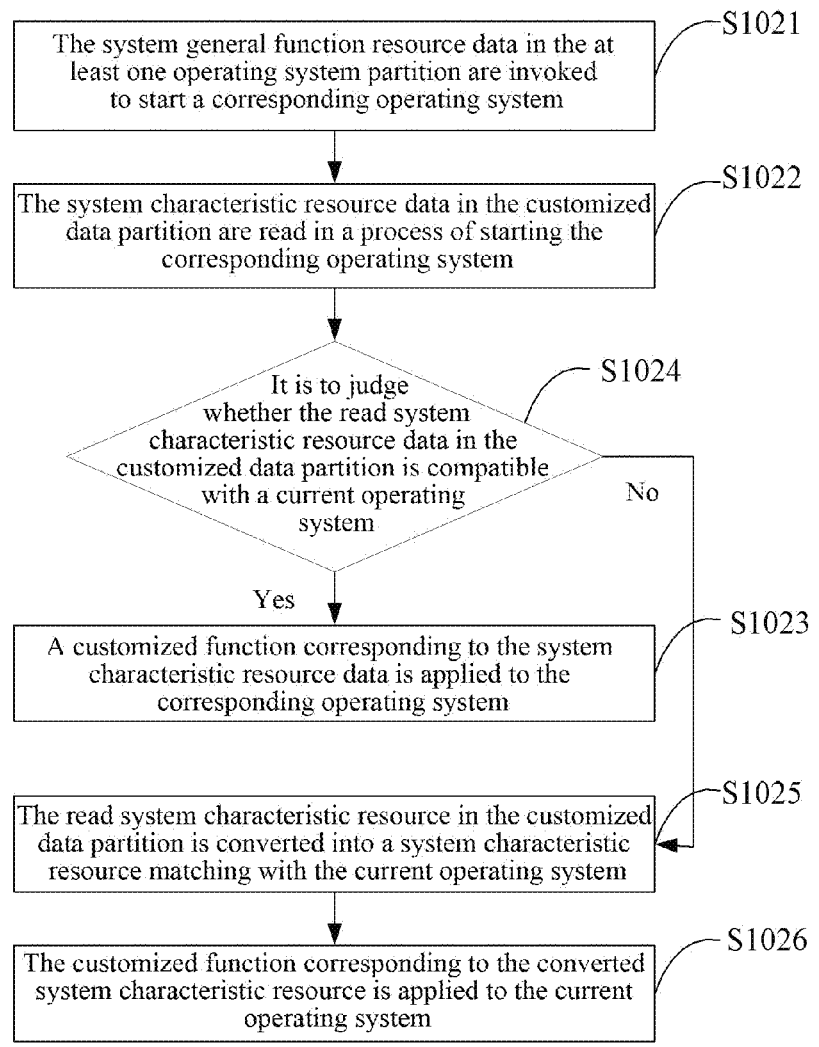
FIG. 3 is another flowchart of sharing resource data of a customized data partition in at least one operating system partition in the embodiment of the present document.

As an embodiment, as shown in FIG. 3, in the step S102, before the step S1023 of applying the customized function corresponding to the system characteristic resource data to the corresponding operating system, the method may further include:

in step S1024, it is to judge whether the read system characteristic resource data in the customized data partition is compatible with a current operating system; if the read system characteristic resource data in the customized data partition is compatible with the current operating system, the step proceeds to step S1023; and otherwise, the step proceeds to step S1025.

In step S1025, the read system characteristic resource in the customized data partition is converted into a system characteristic resource that is compatible with the current operating system.

In step S1026, the customized function corresponding to the converted system characteristic resource is applied to the current operating system.

The above-mentioned solution considers that, when the system characteristic resource data in the customized data partition does not match with the current operating system, the system characteristic resource data in the customized data partition need to be converted to match with the current operating system.

Specifically, in the process of starting the current operating system, the terminal reads the system characteristic resource data in the customized data partition and judges whether the read system characteristic resource data in the customized data partition matches with the current operating system. If the read system characteristic resource data in the customized data partition does not match with the current operating system, the read system characteristic resource in the customized data partition is converted by a data conversion unit into the system characteristic resource which may be recognized by the current operating system, which is then stored in a local operating system database partition and a local system customized resource access interface is provided.

Subsequently, a system management module may read terminal function customized data according to the system customized resource access interface provided by the data conversion unit and applies the terminal function customized data to the current operating system of the terminal, so as to realize sharing of the resource data in the customized data partition in different operating systems.

Figure 4:
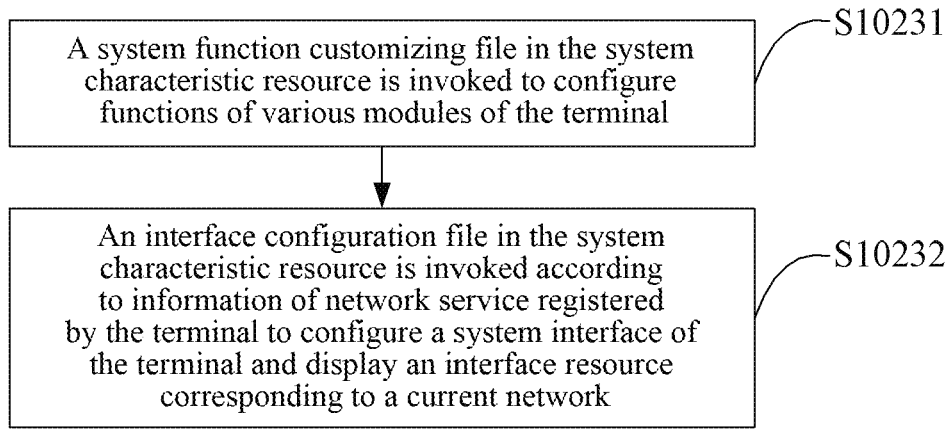
FIG. 4 is a flowchart of applying a customized function corresponding to system characteristic resource data to a corresponding operating system in the embodiment of the present document.

As shown in FIG. 4, the step of applying the customized function corresponding to the system characteristic resource data to the corresponding operating system may include In step S10231, a system function customizing file in the system characteristic resource is invoked to configure functions of various modules of the terminal.

In step S10232, an interface configuration file in the system characteristic resource is invoked according to information of network service registered by the terminal to configure a system interface of the terminal and display an interface resource conforming to a current network.

Herein, when the customized function corresponding to the system characteristic resource is applied to the current operating system, the system function customizing file in the system characteristic resource is invoked to configure the functions of various modules of the terminal, e.g., configure the selection of a network mode and whether to use a WI-FI hotspot function. If the corresponding configuration resource is not read from the system characteristic resource, the default function configuration of the system is used.

Then, the interface configuration file in the system characteristic resource is invoked according to information of the network service registered by the terminal to configure the system interface of the terminal and display the interface resource conforming to the current network, so as to realize the display of the terminal interface. Herein, if the corresponding configuration resource is not read from the system characteristic resource, the default interface configuration of the system is used.

Compared with the existing art, the system general functions and customized functions of the terminal in the existing art are set in one terminal operating system and are stored in one partition, for an operator with a plurality of brands, each brand needs to use a terminal version and consequently the system upgrade and maintenance are caused to be more complex. However, in this embodiment, by partitioning the memory chip of the terminal into the independent customized data partition and the operating system partitions, the system general functions are distinguished from the customized functions, the resource data of the customized data partition and the operating system partitions are respectively managed and the resource data of the customized data partition are shared in one or more operating system partitions, the influence of system operation and update on the customized data is avoided; and since all operating systems in the terminal share and use the resources in the customized data partition and terminal operating system characteristics are customized, the system maintenance complexity and operating cost of the terminal are reduced and at the same time the download traffic of update data is decreased.

Figure 5:
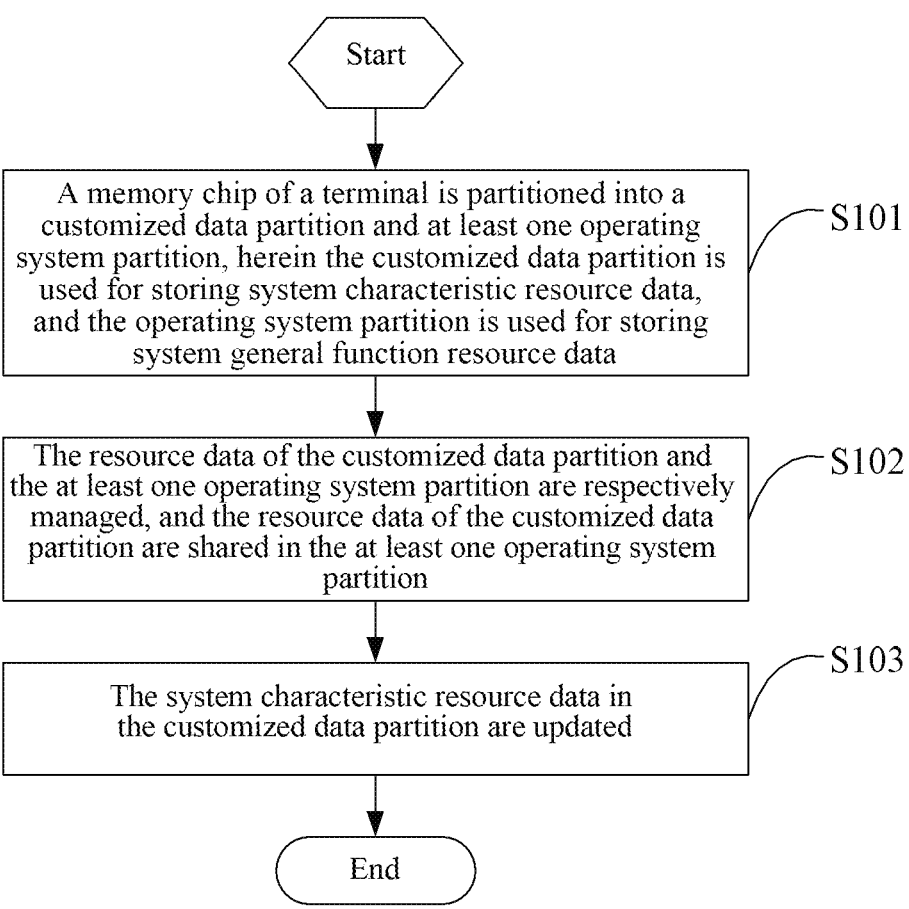
FIG. 5 is a flowchart of another embodiment of a system resource management method for a terminal according to the present document.

As shown in FIG. 5, another embodiment of the present invention provides a system resource management method for a terminal. On the basis of the embodiment as shown in the FIG. 1, after the step S102, the method further includes:

in step S103, the system characteristic resource data in the customized data partition are updated.

This embodiment has the following difference from the embodiment as shown in FIG. 1. This embodiment further includes the solution of updating the system characteristic resource data in the customized data partition in the current operating system.

After the system initialization is completed, the terminal may be periodically connected to the version management server to check and update the system characteristic resource data in the customized data partition.

Specifically, the terminal matches the latest system characteristic customized resource of the version management server by a version updating module according to a local terminal system version number and a system characteristic customized resource version number.

If the system characteristic customized resource which needs to be updated is detected, the system characteristic customized resource to be updated is downloaded into the customized data partition. If it is detected that the resource in the customized partition is the latest and no local conversion and customization were ever performed, the system characteristic customized resource data in the partition are shared and used through conversion.

Therefore, for the terminal with the plurality of operating systems, each operating system may read the resource data in the customized data partition, after the customized data resources are upgraded in one operating system, the customized data resources which have been upgraded can be shared and used by other operating systems, and thus the download traffic of the update data can be reduced.

In addition, since all operating systems in the terminal can share the resource data in the customized data partition, and the operating system characteristics of the terminals are customized, the system maintenance complexity of the terminal can be reduced and the operating cost can be reduced.

The process of each specific implementation link of the solution provided by the embodiment of the present document will be described below in detail by taking an Android system as an example. This solution involves a resource updating module, a data conversion module, a system management module and an interface configuration module.

Figure 6A:
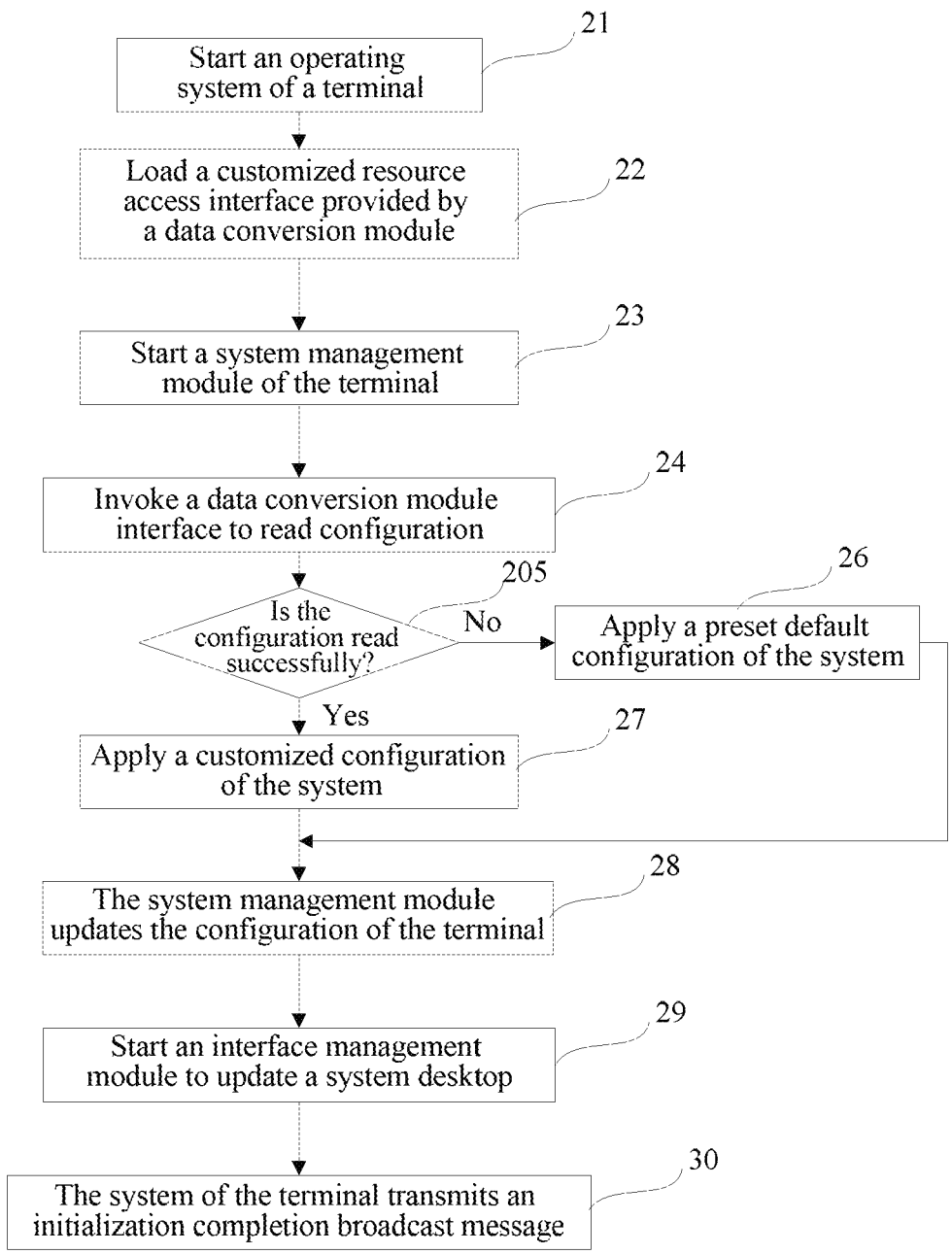
FIG. 6a is a flowchart of starting a terminal operating system in an example of the embodiment of the present document.

As shown in FIG. 6a, a process of starting a terminal operating system in the embodiment of the present document includes:

In step 21, a terminal is powered on and an operating system is started, herein if the terminal is provided with a plurality of operating systems, the operating system may be selected to be started. In this example, the Android system in the terminal is selected to be started.

In step 22, a customized resource access interface provided by a data conversion module is initialized to provide the invoking for other modules. In this example, a system function customizing file is an XML file and a corresponding configuration may be accessed according to a node of a system function.

In step 23, a system management module service of the terminal is started.

In step 24, a system management module of the terminal reads the customized resource access interface, and reads a corresponding configuration according to a configured function node.

In step 25, it is to check whether the configuration of the function node is successfully read, and checking whether the system function customizing file configures the queried function node.

In step 26, a preset default configuration of the system is applied if no corresponding function configuration is read.

In step 27, a customized function configuration is applied if a corresponding function configuration is read.

In step 28, the system management module updates the system function of the terminal and provides a terminal function management service interface.

In step 29, an interface configuration module program is started to configure a system interface. Specifically, a reference may be made to a process as shown in FIG. 6a.

In step 30, after the system initialization is completed, a system broadcast message is transmitted to notify other modules in the system.

Figure 6B:
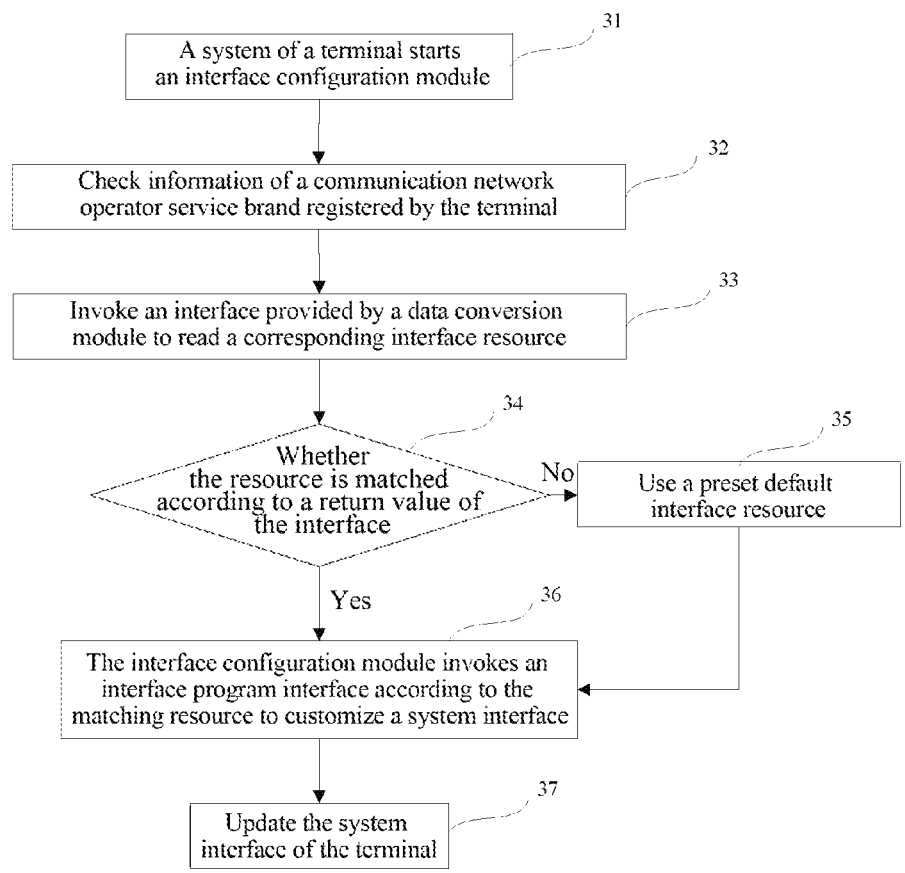
FIG. 6b is a flowchart of configuring a terminal interface in an example of the embodiment of the present document.

As shown in FIG. 6b, a process of configuring a terminal interface in the embodiment of the present document includes:

In step 31, a system of a terminal starts an interface configuration module program, herein the program runs in a background of the system.

In step 32, information of an operator network brand registered by the terminal is checked, and if no network service is registered at current, a desktop customized resource is not matched. A basis of matching is SIM card information or registered network information.

In step 33, an interface resource customizing interface provided by a data conversion module is invoked to access an interface customized resource.

In step 34, it is to judge whether the resource is matched according to a return value of the interface.

In step 35, preset default interface resource is used if the interface customized resource is not matched.

In step 36, customized interface resource is used if the interface customized resource is matched; and an interface provided by a system interface is invoked to configure an interface, including desktop wallpaper, default ring tone, customized service link, etc.

In step 37, the system interface is updated and the process ends.

Figure 6C:
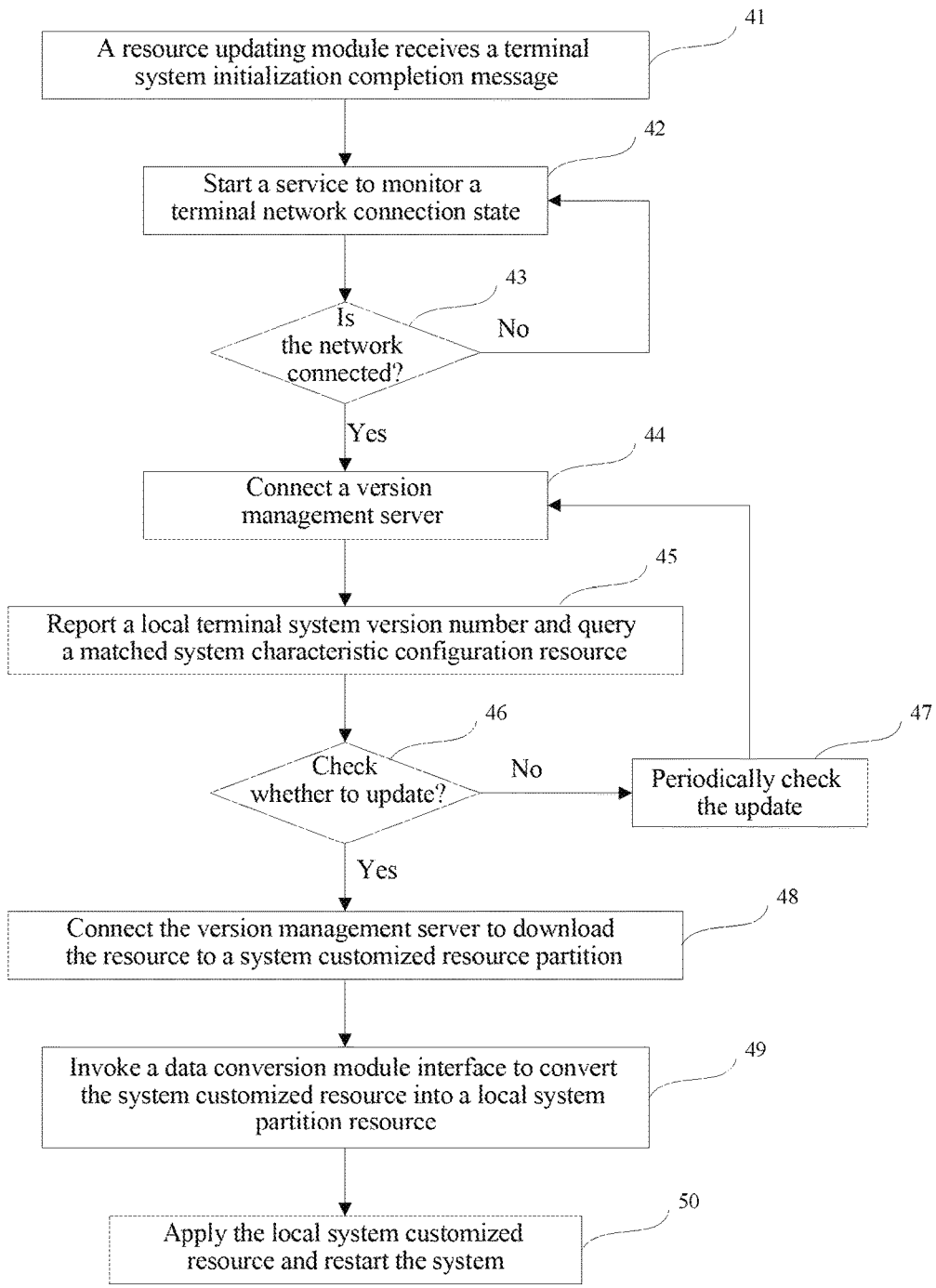
FIG. 6c is a flowchart of updating terminal system characteristic customized resources in an example of the embodiment of the present document.

As shown in FIG. 6c, a process of updating a system characteristic customized resource of a terminal in the embodiment of the present document includes:

In step 41, a resource updating module program receives a message indicating completion of system initialization, the program is self-started and has a system management authority.

In step 42, a resource updating module starts a service thereof to monitor a terminal network connection state message.

In step 43, a network state is checked, it is to continuously monitor if a network is not connected, and it is to continue the process if the network has already been connected.

In step 44, a version management server is connected according to a preset server address.

In step 45, a local terminal system version number is reported to a server and it is to query whether a matched system characteristic customized resource exists.

In step 46, it is to determine whether to update a corresponding resource according to whether the queried system characteristic resource version number is higher than the local version number.

In step 47, the server is periodically connected to check the update if the characteristic customized resource is not matched.

In step 48, the server is connected to download the corresponding resource to a customized data partition if the system characteristic customized resource is matched; or the resource in the partition is directly shared and used under a situation that the customized resource in the partition is the latest but is not converted and applied, i.e., other operating systems have already updated the resource in the partition.

In step 49, a data conversion module interface is invoked to convert the data in the customized data partition, the system characteristic customized resource is localized and an access interface is provided.

In step 50, the system characteristic customized resource is applied and the system is restarted.

Figure 7:
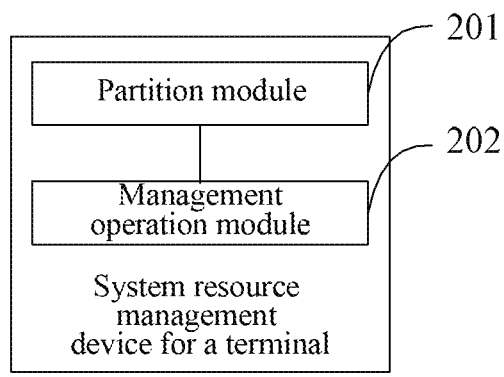
FIG. 7 is a schematic diagram of function modules of an embodiment of a system resource management device for a terminal according to the present document.

As shown in FIG. 7, an embodiment of the present document provides a system resource management device for a terminal, including a partitioning module 201 and a management operation module 202, herein, the partitioning module 201 may be implemented by a processor and is configured to partition a memory chip of the terminal into a customized data partition and at least one operating system partition, herein the customized data partition is used for storing system characteristic resource data, and the operating system partition is used for storing system general function resource data; and the management operation module 202 may be implemented by the memory chip and is configured to respectively manage the resource data of the customized data partition and the at least one operating system partition, and the resource data of the customized data partition are shared in the at least one operating system partition.

The terminal in this embodiment has a communication data service function, may be specifically a terminal device such as a smart phone or a tablet computer or the like, and the terminal may be provided with one or more operating systems, herein, for example, one operating system is an Android smart operating system.

In this embodiment functions of terminal operating systems are divided into general functions and customized functions. For a number of the operating systems, the memory chip of the terminal is correspondingly partitioned into a plurality of operating system partitions and an independent customized data partition, one operating system is installed in each operating system partition and all operating system partitions do not influence with one another. When the terminal is started, the operating system to be started may be selected.

Herein, the operating system partitions are used for storing system general function resource data and may specifically include file contents of corresponding drive read-write partitions.

The customized data partition is used for storing system characteristic resource data, the system characteristic resource data include system function customizing files and system interface customized resources, and may specifically include resource data such as function configuration files, pictures, ring tones and network links of the terminal system and the like. Each system characteristic resource has a unique version number, and matches with a terminal system version number.

In this embodiment the purpose of partitioning the independent customized data partition is that the general functions of the operating systems can be distinguished from the customized functions, such that upgrade of the operating system general function resource data and the system characteristic resource customized data in the terminal are two independent upgrading processes, respective partition contents only need to be updated when updating data, no mutual influence is caused, thus the influence of terminal system update or other operations on data is avoided and at the same time the system version maintenance complexity of the terminal is decreased.

Since the functions of the terminal operating systems are divided into general functions and customized functions and corresponding partitions are respectively arranged, thus, the resource data of the customized data partition and the one or more operating system partitions can be respectively managed, and the resource data of the customized data partition can be shared in the one or more operating system partitions.

Herein, the step of respectively managing the resource data of the customized data partition and the one or more operating system partitions includes: the system characteristic resource data of the customized data partition and the system general function resource data of the one or more operating system partitions are respectively performed operations such as configuration and upgrading and the like.

When upgrading the system characteristic resource data, the terminal periodically downloads the system characteristic resource data from a version management server according to a current terminal system version number, current registered network service information and the like, and stores the system characteristic resource data in the customized data partition.

Herein, the version management server is arranged and maintained by a communication operator or a terminal manufacturer and is used for storing terminal system characteristic customized resources, and each system characteristic customized resource has a unique version number, and matches with a terminal system version number. The system characteristic resources include resources such as system attribute and function configuration files, wallpaper, ring tones and network links and the like.

For a terminal with a plurality of operating systems, when the terminal is started, one operating system may be selected to be started. After the initialization of the terminal operating system is completed, the terminal is periodically connected with the version management server to update the system characteristic customized resources.

In the starting process of the operating system, the customized partition data may be read, by a management module program in the system, and the customized function is applied to the system. Each operating system may read the resource data in the customized data partition, after the customized data resources are upgraded in one operating system, the customized data resources can be shared and used by other operating systems, and thus the download traffic of the update data can be reduced.

In addition, since all operating systems in the terminal can share the resource data in the customized data partition and the operating system characteristics of the terminals are customized, the system maintenance complexity of the terminal can be reduced and the operating cost can be reduced.

Figure 8:
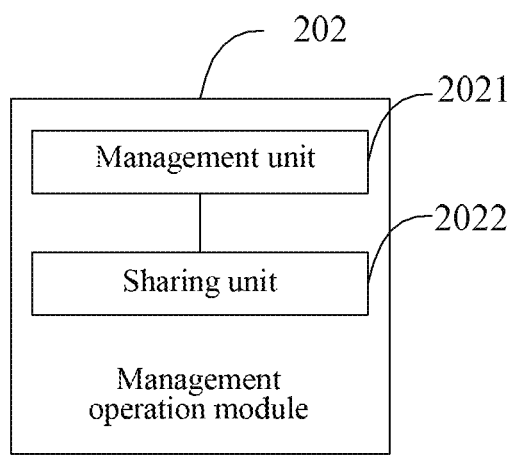
FIG. 8 is a structural schematic diagram of a management operation module in the embodiment of a system resource management device for a terminal according to the present document.

As shown in FIG. 8, as an embodiment, the management operation module 202 includes a management unit 2021 and a sharing unit 2022, herein:

the management unit 2021 is configured to respectively configure and/or upgrade the system characteristic resource data of the customized data partition and the system general function resource data of the at least one operating system partition; and the sharing unit 2022 is configured to invoke the system general function resource data in the at least one operating system partition to start a corresponding operating system; read the system characteristic resource data in the customized data partition in a process of starting the corresponding operating system; and apply a customized function corresponding to the system characteristic resource data to the corresponding operating system.

Through the above-mentioned solution, after the operating system is started, the system characteristic resource data in the customized data partition are read, the operating system characteristics of the terminal are customized, thus the system maintenance complexity of the terminal can be reduced and the operating cost can be reduced.

Figure 9:
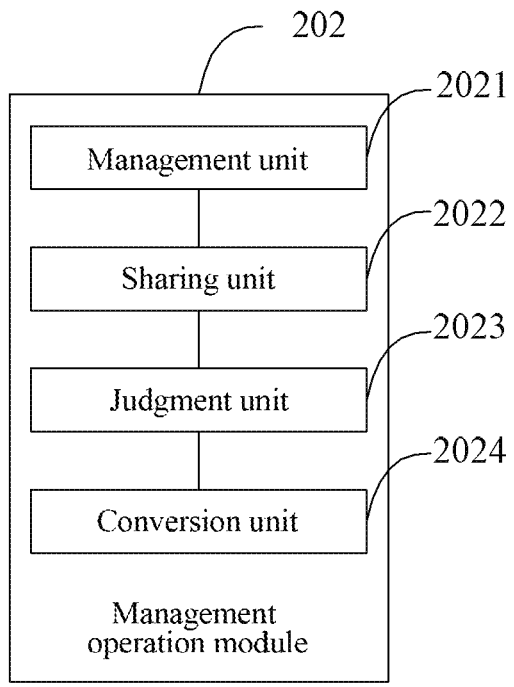
FIG. 9 is another structural schematic diagram of a management operation module in the embodiment of a system resource management device for a terminal according to the present document.

As shown in FIG. 9, as another embodiment, on the basis of the embodiment as shown in the FIG. 8, the management operation module 202 further includes a judgment unit 2023 and a conversion unit 2024, herein, the judgment unit 2023 is configured to judge whether the read system characteristic resource data in the customized data partition matches with a current operating system; if the read system characteristic resource data in the customized data partition matches with the current operating system, the sharing unit applies the customized function corresponding to the system characteristic resource data to the corresponding operating system;

the conversion unit 2024 is configured to convert the read system characteristic resource in the customized data partition into a system characteristic resource matching with the current operating system when the judgment unit judges that the read system characteristic resource data in the customized data partition does not match with the current operating system; and the sharing unit 2022 is further configured to apply the customized function corresponding to the converted system characteristic resource to the current operating system.

The above-mentioned solution considers that, when the system characteristic resource data in the customized data partition does not match with the current operating system, the system characteristic resource data in the customized data partition need to be converted to match with the current operating system.

Specifically, in the process of starting the current operating system, the terminal reads the system characteristic resource data in the customized data partition and judges whether the read system characteristic resource data in the customized data partition matches with the current operating system, if the read system characteristic resource data in the customized data partition does not match with the current operating system, the read system characteristic resource in the customized data partition is converted by a data conversion unit into the system characteristic resource which may be recognized by the current operating system, which is then stored in a local operating system database partition and a local system customized resource access interface is provided.

Subsequently, a system management module may read terminal function customized data according to the system customized resource access interface provided by the data conversion unit and applies the terminal function customized data to the current operating system of the terminal, so as to realize sharing of the resource data in the customized data partition in different operating systems.

Herein, when the customized function corresponding to the system characteristic resource is applied to the current operating system, the system function customizing file in the system characteristic resource is invoked to configure the functions of various modules of the terminal, e.g., configure the selection of a network mode and whether to use a WI-FI hotspot function. If the corresponding configuration resource is not read from the system characteristic resource, the default function configuration of the system is used.

Then, the interface configuration file in the system characteristic resource is invoked according to information of the network service registered by the terminal to configure the system interface of the terminal and display the interface resource conforming to the current network, so as to realize the display of the terminal interface. Herein, if the corresponding configuration resource is not read from the system characteristic resource, the default interface configuration of the system is used.

Compared with the existing art, the system general functions and customized functions of the terminal in the existing art are arranged in one terminal operating system and are stored in one partition, for an operator with a plurality of brands, each brand needs to use a terminal version and consequently the system upgrade and maintenance are caused to be more complex. However, in this embodiment, by partitioning the memory chip of the terminal into the independent customized data partition and the operating system partitions, the system general functions are distinguished from the customized function, the resource data of the customized data partition and the operating system partitions are respectively managed and the resource data of the customized data partition are shared in one or more operating system partitions, the influence of system operation and update on the customized data is avoided; and since all operating systems in the terminal share and use the resources in the customized data partition, and terminal operating system characteristics are customized, the system maintenance complexity and operating cost of the terminal are reduced and at the same time the download traffic of update data is decreased.

Figure 10:
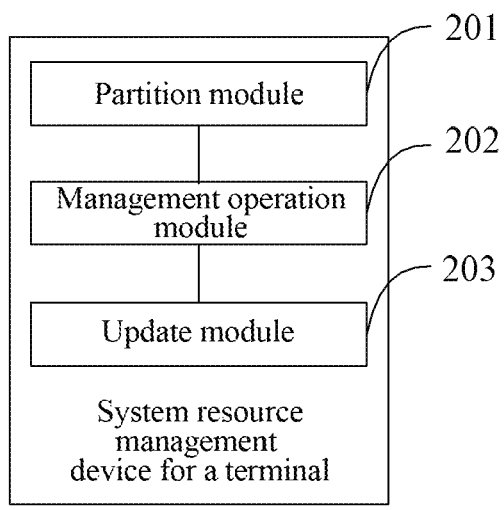
FIG. 10 is a schematic diagram of function modules of another embodiment of a system resource management device for a terminal according to the present document.

As shown in FIG. 10, another embodiment of the present document provides a system resource management device for a terminal, on the basis of the embodiment as shown in FIG. 3, the device further includes:

an updating module 203 configured to update the system characteristic resource data in the customized data partition.

This embodiment has the following difference from the embodiment as shown in the FIG. 7. This embodiment further includes the solution of updating the system characteristic resource data in the customized data partition in the current operating system.

After the system initialization is completed, the terminal may be periodically connected to the version management server to check and update the system characteristic resource data in the customized data partition.

Specifically, the terminal matches the latest system characteristic customized resource of the version management server through a version updating module according to a local terminal system version number and a system characteristic customized resource version number.

If the system characteristic customized resource which needs to be updated is detected, the system characteristic customized resource to be updated is downloaded into the customized data partition. If it is detected that the resource in the customized partition is the latest and no local conversion and customization were ever performed, the system characteristic customized resource data in the partition are shared and used through conversion.

Therefore, for the terminal with the plurality of operating systems, each operating system may read the resource data in the customized data partition, after the customized data resources are upgraded in one operating system, the customized data resources can be shared and used by other operating systems, and thus the download traffic of the update data can be reduced.

In addition, since all operating systems in the terminal can share the resource data in the customized data partition, and the operating system characteristics of the terminals are customized, the system maintenance complexity of the terminal can be reduced and the operating cost can be reduced.

According to the system resource management method and device for the terminal provided by the embodiments of the present document, by partitioning the memory chip of the terminal into an independent customized data partition and operating system partitions, system general function are distinguished from customized functions, the resource data of the customized data partition and the operating system partition are respectively managed, and the resource data of the customized data partition are shared in one or more operating system partitions, the influence of system operation and update on the customized data is avoided; and since all operating systems in the terminal share and use the resources in the customized data partition, and terminal operating system characteristics are customized, the system maintenance complexity and operating cost of the terminal are reduced and at the same time the download traffic of update data is decreased.

The above-mentioned embodiments are just preferred embodiments of the present document and do not hereby limit the patent range of the present document. Any equivalent structure or process transformation made by using the description and drawings of the present document, or direct or indirect applying to other related technical fields, shall be also included in the patent protection range of the present document.

What is claimed is:

1. A method for managing system resources of a communication device with more than one operating systems, comprising:
   partitioning a memory chip of the communication device into an independent customized data partition and more than one operating system partitions, wherein one operating system is installed in one operating system partition, the customized data partition being used for storing system characteristic resource data, and the operating system partitions being used for storing system general function resource data; and
   respectively managing resource data of the customized data partition and the more than one operating system partitions, and sharing the resource data of the customized data partition with the more than one operating system partitions;
   wherein the step of sharing the resource data of the customized data partition with the more than one operating system partitions comprises:
   invoking the system general function resource data in one of the more than one operating system partitions to start a corresponding operating system;
   reading the system characteristic resource data in the customized data partition in a process of starting the corresponding operating system; and
   judging whether the read system characteristic resource data in the customized data partition is compatible with a current operating system; if the read system characteristic resource data in the customized data partition is compatible with the current operating system, executing the step of applying a customized function corresponding to the system characteristic resource data to the corresponding operating system; otherwise,
   converting the read system characteristic resource in the customized data partition into a system characteristic resource that is compatible with the current operating system; and
   applying a customized function corresponding to the converted system characteristic resource to the current operating system;
   wherein the system characteristic resource data include system function customizing files and system interface customized resources.

2. The method according to claim 1, wherein the step of respectively managing resource data of the customized data partition and the more than one operating system partitions comprises:
   respectively configuring and/or upgrading the system characteristic resource data of the customized data partition and the system general function resource data of the more than one operating system partitions.

3. The method according to claim 1, wherein the step of applying the customized function corresponding to the system characteristic resource data to the corresponding operating system comprises:
   invoking a system function customizing file in the system characteristic resource to configure functions of various modules of the communication device; and
   invoking an interface configuration file in the system characteristic resource according to information of network service registered by the communication device to configure a system interface of the communication device and display an interface resource conforming to the network service.

4. The method according to claim 1, wherein the method further comprises:
   updating the system characteristic resource data in the customized data partition.

5. A device for managing system resources of a communication device with more than one operating systems, comprising, a processor, and a non-transitory computer readable medium for storing computer instructions that when executed by the processor cause the processor to perform steps in following modules and units: a partition module and a management operation module, wherein,
   the partition module is configured to partition a memory chip of the communication device-into an independent customized data partition and more than one operating system partitions, wherein, one operating system is installed in one operating system partition, the customized data partition is used for storing system characteristic resource data, and the operating system partitions are used for storing system general function resource data; and
   the management operation module is configured to respectively manage resource data of the customized data partition and the more than one operating system partitions, and share the resource data of the customized data partition with the more than one operating system partitions;
   wherein the management operation module further comprises: a sharing unit configured to invoke the system general function resource data in one of the more than one operating system partitions to start a corresponding operating system; read the system characteristic resource data in the customized data partition in a process of starting the corresponding operating system;
   a judgment unit and a conversion unit, wherein,
   the judgment unit is configured to judge whether the read system characteristic resource data in the customized data partition is compatible with a current operating system; if the read system characteristic resource data in the customized data partition is compatible with the current operating system, the sharing unit applies a customized function corresponding to the system characteristic resource data to the corresponding operating system;
   the conversion unit is configured to convert the read system characteristic resource in the customized data partition into a system characteristic resource that is compatible with the current operating system when the judgment unit determines that the read system characteristic resource data in the customized data partition is not compatible with the current operating system; and the sharing unit is further configured to apply the customized function corresponding to the converted system characteristic resource to the current operating system;

wherein system characteristic resource data include system function customizing files and system interface customized resources.

6. The device according to claim 5, wherein the processor is further configured to, when executing the instructions stored in the non-transitory computer readable medium, execute steps in a following unit a management unit configured to respectively configure and/or upgrade the system characteristic resource data of the customized data partition and the system general function resource data of the more than one operating system partitions.

7. The device according to claim 6, wherein, the sharing unit is further configured to invoke a system function customizing file in the system characteristic resource to configure functions of various modules of the communication device; and invoke an interface configuration file in the system characteristic resource according to information of network service registered by the communication device to configure a system interface of the communication device and display an interface resource conforming to the network service.

8. The device according to claim 5, wherein the processor is further configured to, when executing the instructions stored in the non-transitory computer readable medium, execute steps in a following module:

an updating module configured to update the system characteristic resource data in the customized data partition.

* * * * *